United States Patent
Zhang

(10) Patent No.: US 9,651,694 B2
(45) Date of Patent: May 16, 2017

(54) SPECULAR FILTER (SF) AND DIP ORIENTED PARTIAL IMAGING (DOPI) SEISMIC MIGRATION

(71) Applicant: BP CORPORATION NORTH AMERICA INC., Houston, TX (US)

(72) Inventor: Qie Zhang, Houston, TX (US)

(73) Assignee: BP CORPORATION NORTH AMERICA INC., Naperville, IL (US)

( * ) Notice: Subject to any disclaimer, the term of this patent is extended or adjusted under 35 U.S.C. 154(b) by 251 days.

(21) Appl. No.: 14/230,722

(22) Filed: Mar. 31, 2014

(65) Prior Publication Data

US 2014/0293744 A1 Oct. 2, 2014

Related U.S. Application Data

(60) Provisional application No. 61/807,570, filed on Apr. 2, 2013, provisional application No. 61/836,740, filed on Jun. 19, 2013.

(51) Int. Cl.
*G01V 1/36* (2006.01)
*G01V 1/28* (2006.01)

(52) U.S. Cl.
CPC ............ *G01V 1/28* (2013.01); *G01V 2210/51* (2013.01); *G01V 2210/522* (2013.01); *G01V 2210/671* (2013.01)

(58) Field of Classification Search
CPC ................. G01V 1/28; G01V 2210/51; G01V 2210/671; G01V 2210/522
USPC ............................................... 367/53, 37, 38
See application file for complete search history.

(56) References Cited

U.S. PATENT DOCUMENTS 9,188,689 B2* 11/2015 Lin .................... G01V 1/282

OTHER PUBLICATIONS

Zhang et al., "Efficient reflection tomography with ray take-off directions collected from beam migration," SEG Las Vegas 2012 annual meeting, Nov. 2012, pp. 1-5.*

* cited by examiner

*Primary Examiner* — Daniel L Murphy
(74) *Attorney, Agent, or Firm* — BP America Inc.

(57) ABSTRACT

According to one embodiment, subsurface ray directions in beam migration or subsurface wave propagation directions in reverse time migrations are used to obtain additional Specular Filter (SF) and Dip Oriented Partial Imaging (DOPI) images. SF migration applies a specular imaging condition during migration with a pre-specified subsurface dip field. It boosts the S/N ratio in both images and gathers, by effectively removing migration noise. DOPI images are produced by decomposing a standard migration image according to subsurface dip inclination or/and dip azimuth groups, providing various views of the subsurface image. Both SF and DOPI migration images can supply valuable additional information compared to a standard migration image, and they can be efficiently generated during migration.

15 Claims, 5 Drawing Sheets

*Figure 7*
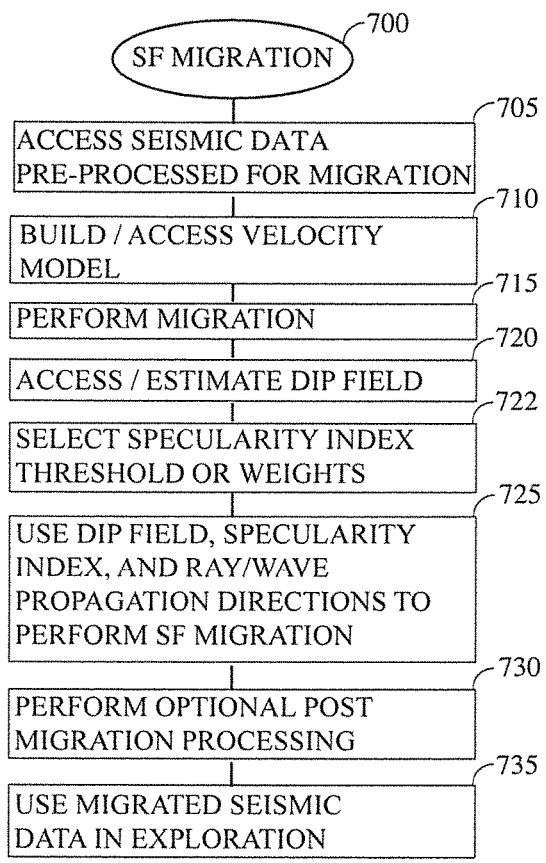
*Figure 6A*  *Figure 6B*  *Figure 6C*  *Figure 6D*
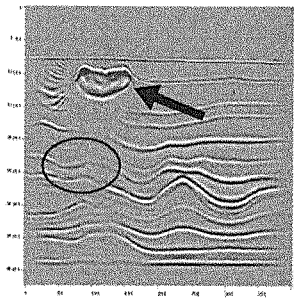 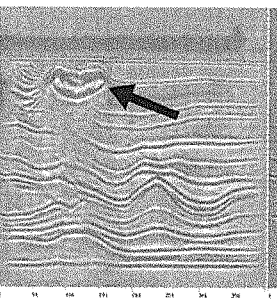 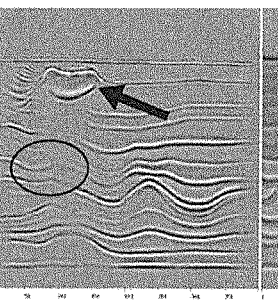 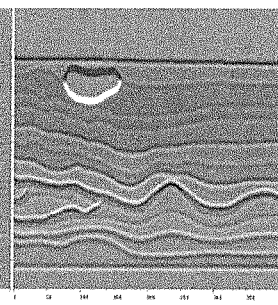

*Figure 8*
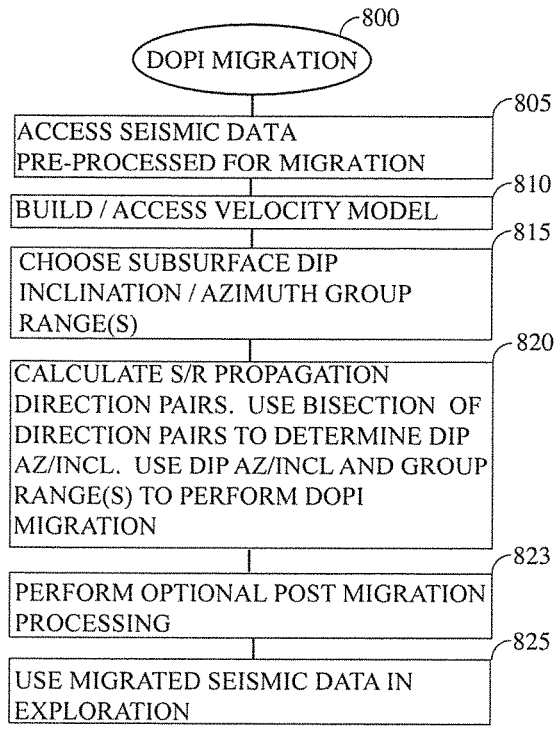
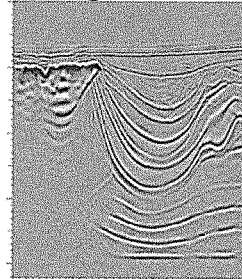 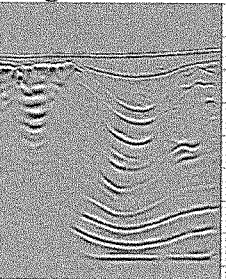 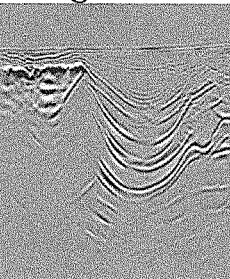 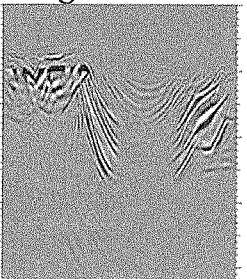
*Figure 9A*   *Figure 9B*   *Figure 9C*   *Figure 9D*
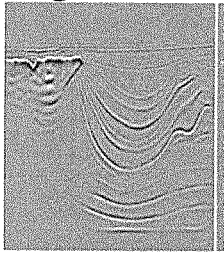 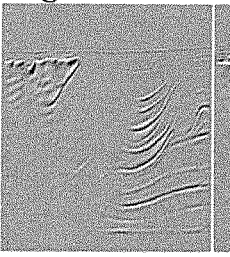  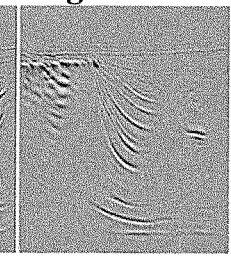 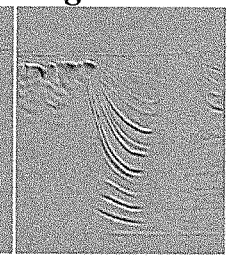
*Figure 10A*  *Figure 10B*  *Figure 10C*  *Figure 10D*  *Figure 10E*

SPECULAR FILTER (SF) AND DIP ORIENTED PARTIAL IMAGING (DOPI) SEISMIC MIGRATION

CROSS REFERENCE TO RELATED APPLICATION

This application claims the benefit of U.S. Provisional Application No. 61/807,570 filed Apr. 2, 2013, herein incorporated by reference in its entirety for all purposes.

TECHNICAL FIELD

This disclosure relates to the general subject of seismic signal processing and, in particular, to methods for using seismic data to image the subsurface for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths when conventional impulsive sources are used are 5-16 seconds, which corresponds to 2500-8000 samples at a 2-millisecond interval. If a non-impulsive source is used, the extended activation time of the source needs to be accommodated for, so the trace lengths will generally be longer. Conventionally each trace records one seismic source activation, so there is one trace for each live source location-receiver activation. In some instances, multiple physical sources might be activated simultaneously but the composite source signal will be referred to as a "source" herein, whether generated by one or many physical sources.

In a typical 2-D survey, there will usually be several tens of thousands of traces, whereas in a 3-D survey the number of individual traces may run into the multiple millions of traces.

Of course, the ultimate goal in acquiring seismic data proximate to an exploration target is to obtain an image representative of the subsurface. To that end, a variety of seismic data processing algorithms have been developed and are routinely utilized. One of the most important of these is seismic migration which is designed to correct, among other things, the arrival time and position of reflectors in the seismic section to make them more closely match the corresponding layer configuration in the subsurface. Seismic migration is especially useful in regions with complex geology, e.g., where the subsurface contains salt domes, faults, folds, etc.

Those of ordinary skill in the art will recognize that there are very large number of migration algorithms, each with its own strengths and weaknesses. However, certain kinds of noise can be troublesome depending on the algorithm that is chosen. For example, migration "swing noise", i.e., noise that cuts across multiple horizons, can be problematic in certain areas. Attenuating or eliminating this sort of noise and other sorts of noise such as multiples, refracted waves, etc., while preserving the underlying seismic signal, is a task that is not well handled by most migration algorithms.

As is well known in the seismic acquisition and processing arts, there has been a need for a system and method that provides a better way to migrate seismic data that does not suffer from the disadvantages of the prior art. Accordingly, it should now be recognized, as was recognized by the present inventor, that there exists, and has existed for some time, a very real need for a method of seismic data processing that would address and solve the above-described problems.

Before proceeding to a description of the present disclosure, however, it should be noted and remembered that the description which follows, together with the accompanying drawings, should not be construed as limiting the disclosure to the examples (or embodiments) shown and described. This is so because those skilled in the art to which the disclosure pertains will be able to devise other forms within the ambit of the appended claims.

SUMMARY

According to one aspect, there is provided a system and method of seismic exploration that makes it possible to image subsurface structures using controllable seismic sources that is superior to that previously available.

According to one embodiment, subsurface ray directions in beam migration are used to obtain additional Specular Filter (SF) and Dip Oriented Partial Imaging (DOPI) images. SF beam migration applies a specular imaging condition during migration with a pre-specified subsurface dip field. This embodiment boosts the S/N ratio in both images and gathers, by effectively removing certain kinds of migration noise. In some embodiments, DOPI images are produced by decomposing a standard beam migration image according to subsurface dip inclination or/and dip azimuth groups. The decomposed partial images can be used to provide various views of the subsurface image. Both SF and DOPI migration images can supply valuable additional information compared to a standard migration image, and they can be efficiently generated in beam migration.

According to one embodiment, Specular Filter beam migration (SF-beam) uses only specular rays (with some specularity tolerance) to produce an image. It removes the non-specular rays from the imaging condition. SF-beam efficiently suppresses migration swing noise (that often cuts across horizons), multiples, refraction waves, etc., produced by the non-specular rays, while it preserves primary signals contributed by the specular rays.

According to another embodiment, there is Dip-Oriented Partial Imaging beam migration (DOPI-beam) that decomposes the full image into a few subsets of partial images according to the arriving ray directions (bisection of source and receiver sides) at subsurface image points. Decomposition criteria can be subsurface dip inclinations or dip azimuths or both. Such partial images provide different, complementary views of the subsurface by enhancing particular structural dips (defined by certain dip inclination and dip azimuth ranges), using well-separated subsurface illumination directions.

According to still another embodiment, the Specular Filter (SF) and Dip Oriented Partial Imaging (DOPI) concepts can be applied to other seismic migration algorithms, including wavefield-based migration. Reverse time migration (RTM) is an example of the wavefield-based migration, where wavefields are generated and used for forming an image. Unlike ray-based migration, where ray propagation directions are computed during migration, the wave propagation directions are typically not available (or at least not automatically computed) in wavefield-based migration, such as RTM. To apply the SF and DOPI concepts to wavefield-based migration, accurate wave propagation directions need to be obtained from wavefields. Optical flow is the method originally used in computer vision to compute the apparent object movement directions from a video (or a series of pictures/still frames). In wavefield-based migration such as RTM, the computed wavefields vary temporally and they can be analyzed as though they were successive frames in a video work. The optical flow idea can be used in seismic migration to calculate the wave propagation directions from a wavefield video. Therefore, according to an embodiment with an extra step of using optical flow to estimate wave propagation directions in RTM, the workflow/procedures of SF or DOPI can be applied to RTM almost the same way as SF or DOPI applied in beam migration.

According to an embodiment, there is provided a method of seismic exploration above a region of the subsurface of the earth containing structural or stratigraphic features conducive to the presence, migration, or accumulation of hydrocarbons, wherein is provided a seismic survey collected proximate to the region of the subsurface of the earth, said seismic survey comprising a plurality of seismic traces, comprising the steps of: (a) accessing at least a portion of said plurality of seismic traces; (b) obtaining a dip field associated with said accessed plurality of seismic traces, said dip field at least being defined at a plurality of (x,y,z) image points within said seismic survey; (c) specifying an upper specular index threshold and a lower specular index threshold different from said upper specular index threshold at each of said plurality of (x,y,z) image points; (d) for each of said plurality of (x,y,z) image points, (i) obtaining one or more source/receiver propagation direction pairs at said (x,y,z) image point, (ii) for each of said obtained one or more source/receiver propagation direction pairs at said (x,y,z) image point, using said dip field to obtain an associated specular index value; (iii) determining an associated upper specular index threshold and an associated lower specular index threshold associated with said (x,y,z) image point, (iv) selecting any source/receiver propagation direction pairs associated with said (x,y,z) image point that have a specular index value greater than said associated upper specular index threshold or less than said associated lower specular index threshold, and, (v) using any of said selected source/receiver propagation direction pairs to form a migrated image at said (x,y,z) image point, wherein said migrated images at said plurality of (x,y,z) image points taken together form a migrated seismic dataset; and, (e) using at least a portion of said migrated seismic dataset in exploration for hydrocarbons within the region of the subsurface of the earth.

According to another embodiment, there is provided a method of seismic exploration above a region of the subsurface of the earth containing structural or stratigraphic features conducive to the presence, migration, or accumulation of hydrocarbons, wherein is provided a seismic survey collected proximate to the region of the subsurface of the earth, said seismic survey comprising a plurality of seismic traces, comprising the steps of: (a) accessing at least a portion of said plurality of seismic traces; (b) accessing at least one dip inclination range; (c) accessing at least one dip azimuth range; (d) performing a DOPI migration using said accessed at least one dip inclination range and said accessed at least one dip azimuth range, thereby creating at least one migrated seismic dataset; and, (e) using at least a portion of said at least one migrated seismic dataset in exploration for hydrocarbons within the region of the subsurface of the earth.

According to still a further embodiment, there is provided a computer system containing a plurality of computer instructions adapted to perform a method comprising: (1) accessing a plurality of seismic traces collected proximate to a subsurface target; (2) performing a migration on said plurality of seismic traces; (3) obtaining from said migration an estimate of a dip field, said dip field at least being defined at a plurality of (x,y,z) image points proximate to said subsurface target; (4) specifying a specular index threshold greater than zero at each of said (x,y,z) image points; (5) for each of said (x,y,z) image points, (i) obtaining one or more source/receiver propagation direction pairs at said (x,y,z) image point, (ii) using said dip field and any of said one or more source/receiver propagation direction pairs at said (x,y,z) image point to obtain a specular index value associated with said any of said one or more source/receiver direction pairs; (iii) determining a specular index threshold associated with said (x,y,z) image point, (iv) selecting any source/receiver propagation direction pairs associated with said (x,y,z) image point that have an absolute value of said obtained specular index value greater than said associated specular index threshold, and, (v) using any of said selected source/receiver propagation direction pairs to form a migrated image at said (x,y,z) image point, wherein said migrated images at each of said plurality of (x,y,z) image points taken together form an SF migrated seismic dataset; and, (6) using at least a portion of said SF migrated seismic dataset in exploration for hydrocarbons proximate to said subsurface target.

According to a further embodiment, there is provided a computer system containing a plurality of computer instructions adapted to perform a method comprising: (1) accessing a plurality of seismic traces collected proximate to a subsurface target; (2) accessing at least one dip inclination range; (3) accessing at least one dip azimuth range; (4) performing a DOPI migration using said accessed at least one dip inclination range and said accessed at least one dip azimuth range, thereby creating at least one migrated seismic dataset; and, (5) using at least a portion of said at least one migrated seismic dataset in exploration for hydrocarbons within the subsurface target.

According to still a further embodiment, there is provided a method of seismic exploration above a region of the subsurface of the earth containing structural or stratigraphic features conducive to the presence, migration, or accumulation of hydrocarbons, wherein is provided a seismic survey collected proximate to the region of the subsurface of the earth, said seismic survey comprising a plurality of seismic traces, comprising the steps of: (a) accessing at least a portion of said plurality of seismic traces; (b) obtaining a dip field associated with said accessed plurality of seismic traces; (c) specifying at least one specular index threshold less than 1.0; (d) using said dip field in conjunction with said at least one specular index threshold to guide a specular filter migration applied to said accessed plurality of seismic traces, thereby creating a migrated seismic dataset; and, (e) using at least a portion of said migrated seismic dataset in exploration for hydrocarbons within the region of the subsurface of the earth.

Other embodiments and variations are certainly possible within the scope of the presently described embodiments and can readily be formulated by those of ordinary skill in the art based on the disclosure herein.

The foregoing has outlined in broad terms the more important features of embodiments disclosed herein so that the detailed description that follows may be more clearly understood, and so that the contribution of the instant inventor to the art may be better appreciated. Present embodiments are not to be limited in its application to the details of the construction and to the arrangements of the components set forth in the following description or illustrated in the drawings. Rather, other embodiments may be practiced and carried out in various other ways not specifically enumerated herein. Finally, it should be understood that the phraseology and terminology employed herein are for the purpose of description and should not be regarded as limiting, unless the specification specifically so limits an embodiment.

BRIEF DESCRIPTION OF THE DRAWINGS

Other objects and advantages will become apparent upon reading the following detailed description and upon reference to the drawings in which:

FIGS. 6A-6D provide a schematic illustration of some operational aspects suitable for use with the SF migration aspect of the instant application.

FIG. 7 illustrates an operating logic suitable for use with an embodiment of SF migration.

FIG. 8 illustrates an operating logic suitable for use with an embodiment of the DOPI migration taught herein.

FIGS. 9A-9D contain an example of a DOPI beam migration over different ranges of dip angles.

FIGS. 10A-10E contain A DOPI beam migration example using different ranges of dip azimuths.

DETAILED DESCRIPTION

Figure 1:
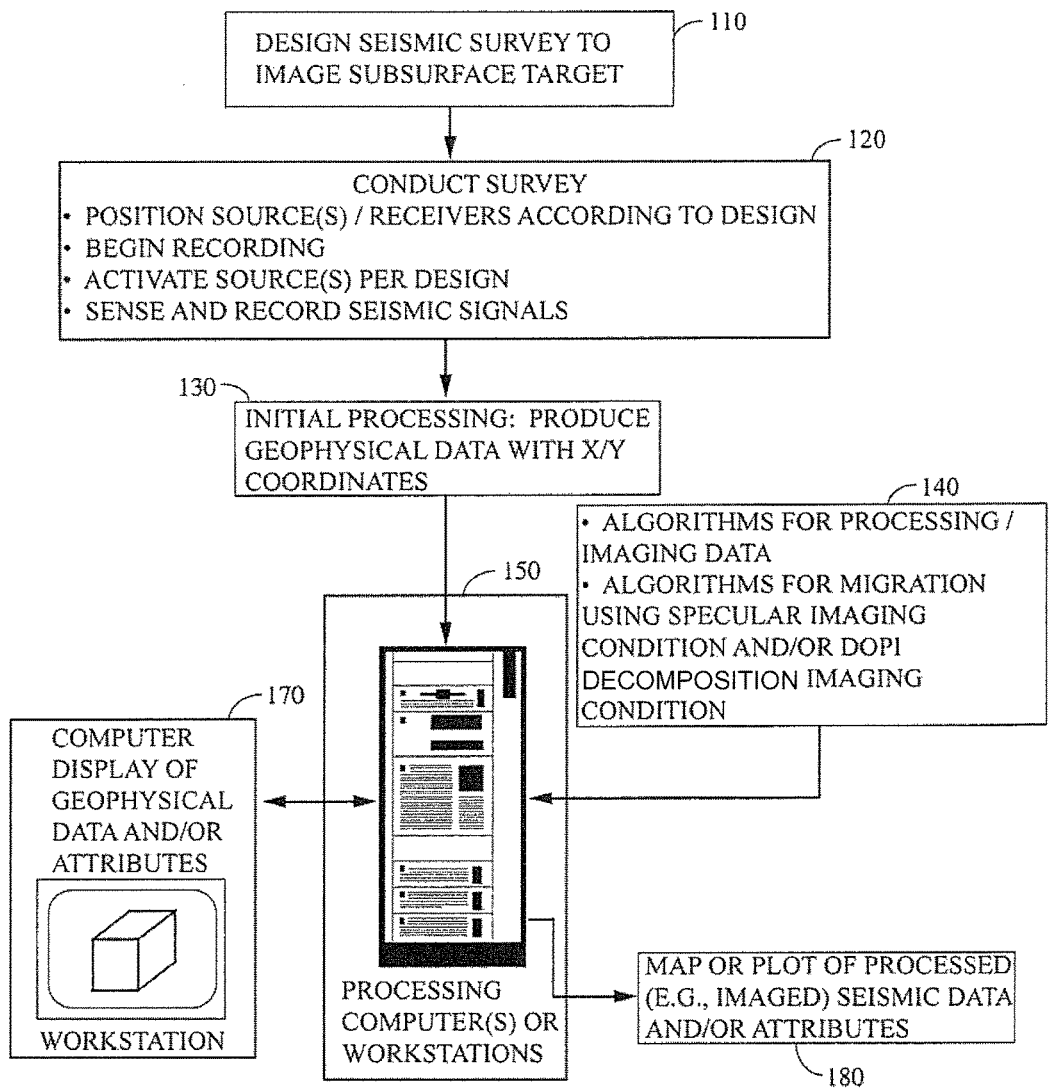
FIG. 1 illustrates a general processing environment.

There is shown in the drawings, and will herein be described hereinafter in detail, some specific embodiments. It should be understood, however, that the present disclosure is to be considered an exemplification of the principles described herein and is not intended to be limited to the specific embodiments or algorithms so described.

Embodiments

According to an embodiment, there is provided a system and method for improving images derived from seismic data by improving the quality of the migration that is applied thereto.

Turning to FIG. 1, this figure contains a general overview of the instant embodiment and its associated environment. As is indicated, a seismic survey will be designed 110 according to methods well known to those of ordinary skill in the art. The survey might be, for example, a VSP (vertical seismic profile), land survey, marine survey, cross hole survey, or some combination. Those of ordinary skill in the art will understand how surveys are designed and especially how such might be done where the object is to image a particular subsurface target.

In the field, seismic data will be collected according to the survey design (block 120), possibly as-modified by conditions in the field. This will typically involve positioning source and receivers at least approximately according to the design and recording source activations as is typically done. The recorded seismic waves (i.e., the seismic data) may (or may not) be subjected to some in-field processing before transmitting it on to a processing center where the bulk of the processing will typically take place.

Typically within a processing center some initial processing will be performed to associate each seismic recording with a surface or other location (block 130), although some aspects of this block might also have been performed in the field. In either case, a computer system 150, which might be a workstation, a server, a main frame, a parallel computer, a networked collection of computers or workstations, etc., will typically be engaged to process the data further in preparation for using it in exploration.

Next, in some variations computer implemented algorithms that are designed to image the subsurface of the earth will be brought into or accessed by the computer that is to apply them (item 140). Such algorithms, including algorithms suitable for implementing the instant embodiments, will typically be made available to a computer that is to utilize them via access to some amount of local or remote hard disk or other storage. Additional algorithms useful in the processing of seismic data may be similarly provided to the CPU 150 which might be any conventional or unconventional programmable computing device.

Conventionally, the seismic data will be processed and viewed on a computer display such as that of a workstation 170. Output from the seismic processing may be used to create maps or plots of seismic data and/or seismic attributes 180 according to methods well known to those of ordinary skill in the art.

Figure 2:
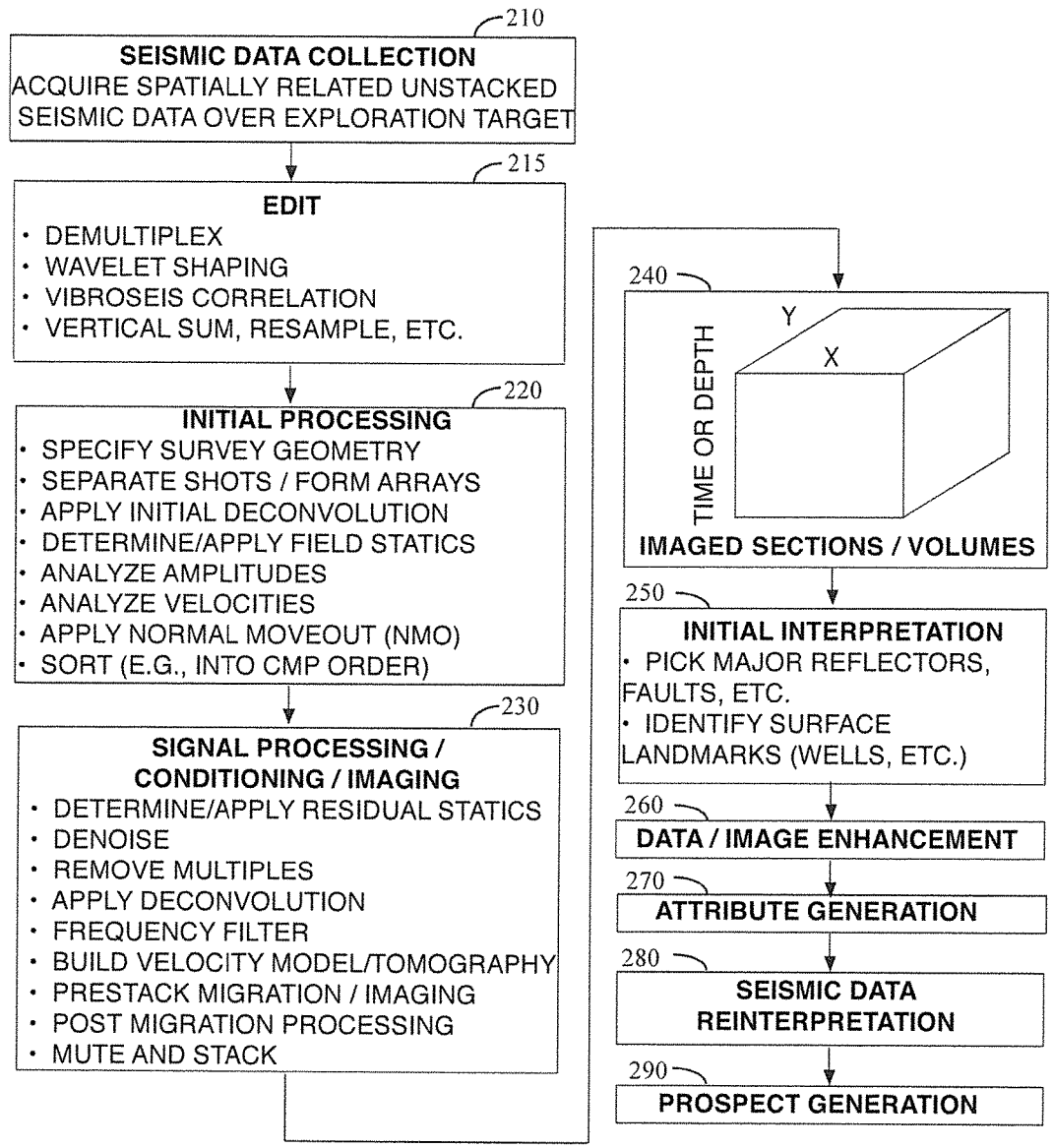
FIG. 2 contains an example processing sequence of the sort that might be utilized.

FIG. 2 contains additional details of a typical seismic processing sequence suitable for use with seismic data collection 210, editing 215, some sort of initial processing 220, conditioning of the signal and imaging 230, production of imaged sections or volumes 240, initial interpretation of the seismic data 250, further image enhancement consistent with the exploration objectives 260, generation of attributes from the processed seismic data 270, reinterpretation of the seismic data as needed 280, and ultimately generation of a drilling prospect 290. In some embodiments, present embodiments might be implemented as part of block 230 and/or 260. Of course, those of ordinary skill in the art will recognize that the foregoing are just examples of the many sorts of processing schemes that might be utilized with seismic data. A particular seismic processing sequence might use processes drawn from some or all of these blocks.

Turning next to a discussion of some aspects of an embodiment, subsurface ray directions in beam migration are used to derive novel additional Specular Filter (SF) and Dip Oriented Partial Imaging (DOPI) images. SF beam migration applies a specular imaging condition during migration with a pre-specified dip field. It tends to boost the S/N ratio in both images and gathers, by effectively removing migration noise. In some embodiments, DOPI images are produced by decomposing a standard beam migration image according to subsurface dip inclination or/and dip azimuth groups, providing various views of the subsurface image. Both SF and DOPI migration images can supply valuable additional information compared to a standard migration image, and they can be efficiently generated in beam migration.

In traditional migration, a traveltime table is the primary quantity used to map the surface recorded seismic signals to the subsurface image space for ray-based migration (e.g., Kirchhoff migration and beam migration). Green's functions are used instead for wave field-based migration (e.g., Wave Equation Migration (WEM) and Reverse Time Migration (RTM)). However, ray/wave propagation directions can play a very important role in the imaging condition. By way of general explanation, Snell's law states that at any reflection point in an isotropic medium, the incidence angle and reflection angle are equal, or specularity is honored. The rule holds true in an anisotropic medium too if phase angles are utilized. As is discussed hereinafter in connection with present embodiments, the concept of specularity can be used as an additional constraint for migration, resulting in an effective signal/noise or signal/signal separation.

The specular condition is not usually used for seismic migration in the industry, but its importance has been widely recognized for ray-based reflection tomography, where the velocity updates are back-projected along the ray paths determined by specularity at every RMO (i.e., residual moveout) picking point. This helps insure that the inverted velocity updates are placed at correct positions.

A previous study of coupling beam migration and reflection tomography (Zhang et al., 2012) introduced a new "QC image" concept for tomography by forming an extra migration image using only specular rays (a very small fraction of all rays). Whether the QC image mimics the standard migration image determines if the correct ray paths are chosen for tomography. In some cases this QC image can be "cleaner" and easier to interpret. The disclosure of this reference is included as an appendix hereto and is incorporated herein by reference as if fully set out at this point.

According to this aspect of present embodiments, the focus will be on the QC image formed by specular rays, hereinafter referred to as Specular Filter (SF) migration. It is worth noting that SF migration is a self-fulfilling process. It requires a-priori information of a dip field, which can be measured from a previous standard migration image or interpreted horizons (e.g., from picking or modeling). Spatially varying dips with a specular tolerance value or spatially varying specular tolerance values for the whole-image-space SF migration are used, which makes it different from prior art approaches, where two constant dip bounds (namely, estimated horizon dip angle extremes) are used for target-zone migration. In some embodiments, SF beam migration is implemented with both source and receiver rays shot downwards from the seismic recording/acquisition surface, which makes it different from prior art approaches such as shooting rays upwards from image points.

Figure 3:
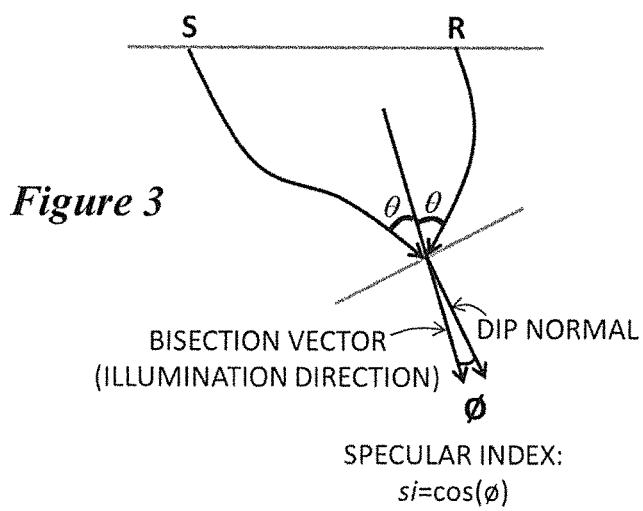
FIG. 3 contains a schematic illustration of how the specular index, si, is defined for use in SF migration according to one embodiment. The direction of the bisection vector (of the source and receiver ray arriving directions) in FIG. 3 is used in some embodiments for decomposing a standard full image to produce DOPI migration images.

According to another aspect of present embodiments, there is provided another approach to migration, called Dip Oriented Partial Imaging (DOPI) migration, hereinafter. This approach decomposes a standard migration image into subsets of partial images, based on potential subsurface dip inclinations or dip azimuths or both, that various ray/wave propagation directions try to illuminate. In other words, the DOPI image sub-volumes are categorized by the orientations of the vectors (see the bisection vector or illumination vector in FIG. 3) that bisect actual source and receiver ray/wave propagation directions at image points, based on the assumption that the potentially illuminated reflector and the corresponding bisection vector are orthogonal (i.e., specular condition).

In this way, DOPI migration separates horizons or faults according to their varying orientations, and provides additional views of the subsurface image from different angles. DOPI migration can also indicate potential velocity errors when different image subsets do not focus the same event. In contrast to SF migration, DOPI migration does not require a pre-specified subsurface dip field.

SF and DOPI concepts can be applied in both ray-based migration and wavefield-based migration. In Kirchhoff migration and beam migration, obtaining ray directions costs almost nothing, because they are always populated with routine ray tracing. However, in WEM and RTM, wave propagation directions are more difficult and costly to obtain. In the first part of this document, pre-stack depth beam migration is used as a carrier of SF and DOPI concepts.

The specular index si (Zhang et al., 2012, which reference is incorporated herein for all purposes as if fully set out at this point) is a key element for judging the specular condition in SF beam migration. It is defined by the value of $\cos(\emptyset)$ in FIG. 3, that is, a dot product of the dip normal vector and the normalized bisection vector between the source and receiver ray arriving directions (in the case of an isotropic medium) calculated through ray tracing, not from a constant ray parameter assumption, at the image point. In anisotropic media the specular index si is defined and applied the same way as in isotropic media, except the ray arrival directions are replaced by corresponding slowness vector directions. Said another way, the specular index is determined from a pair of propagation directions (one from a source and the other from a receiver) in combination with the dip field at the image point. In an embodiment, si will be in the range of [−1 1], and its value close to 1 (or −1) means the specular condition is reasonably well honored. In practice, a threshold of |si|>0.9 or 0.8 will often be chosen for SF beam migration, which corresponds to a specular tolerance of about 26° or 37°, respectively. As a specific example, if the threshold value is chosen to be 0.9 (i.e., |si|>0.9) and the dip field at a point is 30°, source/receiver ray pairs that potentially contribute to reflectors whose dip ranges are within the interval 30°±26° would be kept for imaging. Of course, the absolute value of the threshold might be chosen to be zero, in which case no thresholding would be performed. Because the estimated dip field typically varies spatially, the upper and lower dip thresholds can vary accordingly as a function of the (x,y,z) location. In some embodiments, a weighting scheme (such as Gaussian, cosine or triangle tapers) instead of a hard threshold could be used. In other embodiments, there might be a plurality of thresholds that vary spatially at different (x,y,z) locations throughout the survey region. In still further embodiments, the thresholds might vary in time and/or spatially.

Figure 4:
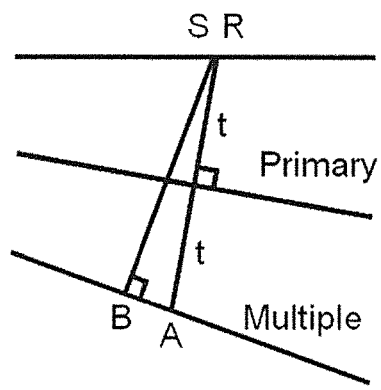
FIG. 4 contains a schematic illustration that makes clearer how one embodiment operates on seismic data in connection with one variation of the SF migration embodiment.

A figure has been provided to make it clearer how SF migration works in some embodiments (FIG. 4). In this example, a dipping primary reflector and its first order multiple are plotted, assuming a zero offset acquisition and a constant velocity medium. Standard migration with only a travel time constraint produces both the primary and multiple reflectors. In contrast, SF migration is capable of removing the multiple reflector with an extra constraint of specularity, because the primary reflector is the only one that satisfies both constraints.

As shown in FIG. 4, multiple point A honors travel time but not specularity, and B honors specularity but not travel time. Since in this example no points along the multiple reflector satisfy both, the multiple reflector will not be imaged by SF migration. On the other hand, it is also clear that when the dip of primary reflector is gentle, SF migration may not do much with the multiple reflector. Note that, although only a demultiple case is explained, in practice, SF migration may be more effective in migration swing suppression. In some embodiments, it can also potentially remove refractions, head waves, converted waves, and etc.

Note further that thresholding si actually imposes a tolerance constraint around the dip at the coordinate point (x,y,z) in the subsurface, i.e., at points in space within the seismic survey coverage, where x and y refer to horizontal coordinates on the surface of the earth and z to a depth within the earth (or, alternatively, a one or two way travel time since time and depth are generally interchangeable in seismic surveys). In other words, source/receiver ray pairs that contribute to reflectors whose dips (e.g., azimuth and/or inclination dip) differ too much from the defined dip field at a point will be eliminated from the migration, depending on the selected value of the threshold. Said another way, the dip field, which potentially varies at each point in (x,y,z) space, guides the SF filter. This is one important aspect of present embodiments.

Figure 5A:
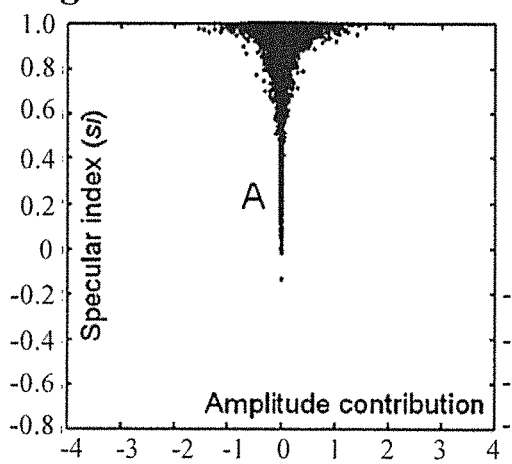
FIGS. 5A-5C contain plots of specular index versus amplitude contribution plot for image points 5A (zero amplitude), 5B (negative amplitude), and 5C (positive amplitude) in FIG. 5D.
Figure 5B:
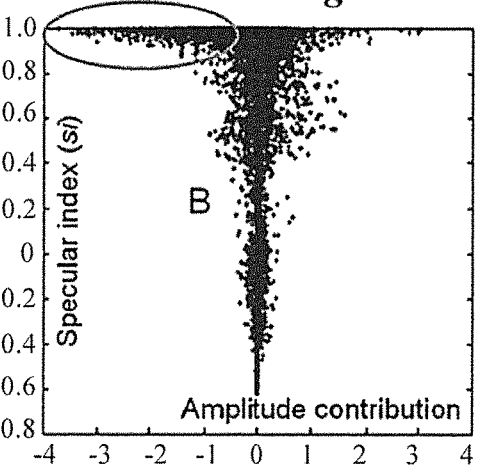
Figure 5C:
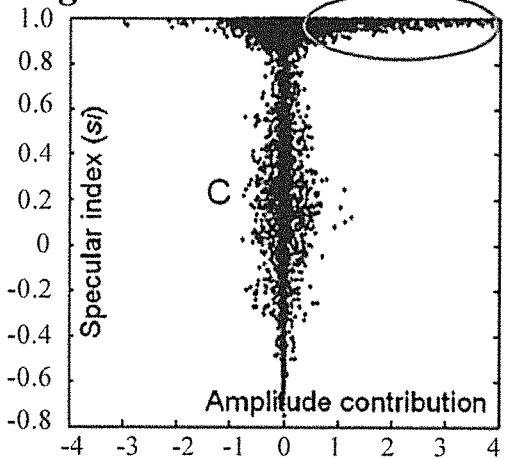
Figure 5D:
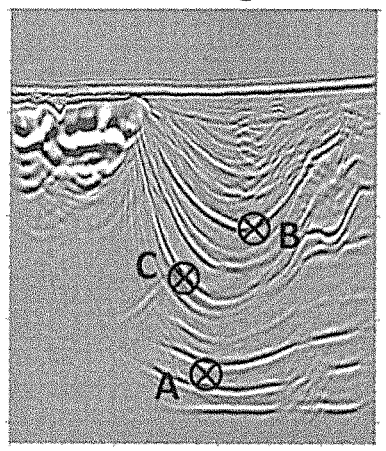

Turning next to FIGS. 5A-5D, this figure provides an illustration of why the specular condition can be an important consideration when constructing an image. In this particular embodiment, FIG. 5D is a cross section (inline) of a single offset (~4 km) 3D depth beam migration image from a synthetic marine NAZ dataset and its associated true TTI velocity model. Three image points are chosen for this example: A) a zero amplitude point not at any reflector; B) a negative amplitude point at a reflector; and C) a positive amplitude point at a reflector (FIG. 5D). The local dips were calculated at those three points, and fed into the migration process. During migration, the amplitude contributions from all possible arriving ray paths were collected at those three points and plotted against the horizontal axis in FIGS. 5A-5C, respectively. Also the si values from those contributing source/receiver ray pairs were collected and aligned against the vertical axis. Specular rays (si close to 1) contribute large and dominant signals (circles in FIGS. 5B and 5C), while non-specular rays produce mostly noise (or signals not supposed to be placed at those three points). In some embodiments, the noise from non-specular rays is expected to be canceled out during summation. However, an uneven ray path distribution may make that difficult. Nonetheless, the non-specular rays can be ignored in some variations when constructing an image, which is the nature of SF migration.

Turning next to FIG. 7, this figure contains an operating logic 700 suitable for use with an instant embodiment of the SF migration variation. In one embodiment, the instant method will begin by accessing seismic data collected proximate to an exploration target of interest (block 705). In this embodiment, the seismic data will comprise unstacked seismic traces. It is desirable, but not necessarily required, that some amount of pre-processing will have been done to the seismic traces before migration (see, blocks 215 to 230 in FIG. 2).

Next, and as is conventionally done, in this embodiment a subsurface velocity model will be accessed or created according to methods well known to those of ordinary skill in the art (block 710). In some variations, the explorationist or seismic processor will prepare the subsurface velocity model for use with present embodiments. In other cases, a velocity model that has been developed for other purposes will be accessed and used. It should be understood that this model may not be particularly accurate, but it should at least be a rough approximation of the true/unknown subsurface velocities.

Next, according to an embodiment a migration will be performed using the velocity model according to methods well known to those of ordinary skill in the art (block 715). The migration algorithm that is used could be, by way of example only, a Kirchhoff migration, a beam migration, a one way wave equation migration, a reverse time migration, etc. In some embodiments two cubes of data will be obtained from the resulting image: a volume of inclination dip values and another volume of azimuthal angle values. In the SF migration embodiment, these cubes of data can be used as the estimate of the dip field in the blocks that follow. In one variation, the two cubes will each be the size of the image volume and will be represented in the depth domain. Of course, those of ordinary skill in the art will understand that, given the relevant velocities, it is straightforward to change from depth to time. Thus, when it is said that a trace is represented in depth (or time) it should be understood that it could as easily have been represented in the other domain, e.g., time (or depth).

Next, in this embodiment the previously created subsurface dip field will be accessed and/or estimated (block 720) if it has not been done so already. In some cases the dip field estimate might be calculated from migration as is explained above or, in other instances, supplied by a user. One approach to calculating the dip field would be to use a semblance or a plane-wave destruction method. Another approach would be to use interpreted horizons. In an embodiment, this dip information will be calculated from images produced by standard migration or SF migration, where the migration algorithm used might be Kirchhoff migration, beam migration, one-way wave equation migration, or reverse time migration, etc.

Next, in some embodiments a specularity index threshold will be selected or a weighting scheme specified (block 722). For example, in some cases the threshold might be about |si|>0.9 or 0.8, which corresponds to a specular tolerance of approximately plus or minus 26° or 37°, respectively. In this way the previously obtained dip field guides the specular filter in that only source/receiver ray pairs that contribute to reflector dips within some specified angle/azimuth boundaries of the dip field will be used in the migration. In some embodiments, the image amplitude contribution from a source/receiver ray pair might be weighted using a Gaussian, cosine or triangle taper according to its specular index or some other weighting scheme.

In this embodiment SF migration will next be performed (block 725). In more particular, in one embodiment the SF migration will be performed using specular index thresholding or specular index weighting. In this embodiment, SF migration and standard migration images can be generated simultaneously in this block if desired. SF migration according to present embodiments could be implemented via Kirchhoff migration, beam migration, one-way wave equation migration, reverse time migration, etc. If the migration used is ray-based (e.g., beam migration) the ray propagation directions might be obtained directly from ray tracing during the migration. If the migration was wavefield-based (e.g., RTM) as an example, the wave propagation directions might be obtained by optical flow which is further discussed below. The resulting image will be one that is formed predominantly from specular reflections.

During the SF migration a determination will be made at each image point (x,y,z) of the directions of the wave fronts that are approaching. In instances where the migration utilizes ray tracing, this will be the two local directions of the wave fronts at an image point as calculated from rays traced from the source and receiver locations at the acquisition surface. In an anisotropic medium case, phase velocity directions instead of the ray directions could be used. See, e.g., FIG. 3 and the discussion of si, supra.

Then, in an embodiment if the calculated magnitude of si for a pair of wave fronts from a source and a receiver is less than a threshold value, that wave front pair won't be used in the image calculation at that point. If, on the other hand, the value of si is greater than the threshold value, that wave front pair will be used. Similarly, if the threshold is expressed in terms of a taper, the wave front pair will be weighted by the taper value (which depends on si) before being added to the image at that point.

The SF migrated image (block 725) will be useful in seismic exploration, monitoring, etc. (block 735) as would be any migrated dataset. The SF migrated offset/angle gathers data might also be useful in tomographic or AVO/AVA analyses, etc. Additionally, though, because of the unique imaging qualities of the instant method, comparisons between datasets processed by SF migration and conventional migration can give insights into and information about subsurface structures that may not be well imaged on conventionally migrated datasets.

FIGS. 6A-6D continue the previous example and illustrate some aspects of an embodiment of the foregoing using synthetic seismic data. The synthetic seismic dataset is intended to represent a cross line example from a synthetic 3D dataset. First, run standard beam migration and produce a stack image (FIG. 6A). Second, the dip field of the stack image is estimated, in some embodiments, by a semblance or plane-wave destruction method, or from interpreted horizons. The semblance method is used in the example of FIG. 6B. Next, the dip field is supplied to the SF beam migration algorithm which is used to generate the SF image (FIG. 6C). Note the subsalt reflectors (circles) are continuous in the SF migration image and the true horizon model (FIG. 6D), but not in the standard migration image (FIG. 6A). The comparison between FIGS. 6A and 6C also demonstrates that SF migration effectively removes migration swings which may have been caused by the complex overburden, in this case, the salt body that was a part of the model (see the region indicated by an arrow in FIGS. 6A-C).

Turning next to a discussion of an embodiment of the DOPI migration algorithm and as is generally set out in FIG. 8, in this variation of the method the same SF migration principle is used but it is applied in a different way. Instead of supplying the migration with a previously estimated structural dip field (which may or may not be particularly accurate) as in the case of SF migration, a limited range of subsurface dip inclinations and azimuths is provided as an input to the DOPI migration. As a consequence of the specularity of the SF principle implemented in DOPI migration, only those parts of the subsurface will be well imaged that correspond to the processor-provided range of the subsurface dip inclinations and azimuths. This can be repeated for different ranges of dips/azimuths or their combinations, which can be achieved through either a single run of DOPI migration which yields multiple DOPI outputs or multiple runs of a single-range/multi-range DOPI migration. In this way, the image of the subsurface can be decomposed into different Dip-Oriented Partial Images (DOPI), each of them illuminating and enhancing subsurface features of different dips and orientations. Note that if the specified dip angle and azimuth groups cover the whole dip angle space [0°, 90°] and the whole dip azimuth space [0°, 360°], then the DOPI images form complete decomposed subsets of a full image.

In FIG. 8, which illustrates one embodiment of the DOPI migration (block 800), as before a seismic dataset will be accessed (block 805) and a velocity model constructed or obtained (block 810). Typically, this dataset will have been pre-processed for migration. In some embodiments, this will be an unstacked seismic dataset collected proximate to an exploration target of interest.

Next, in an embodiment, ranges for subsurface dip inclination/azimuth groups will be specified (block 815). That is, in one embodiment the full inclination (i.e., 0° to 90°) will be divided into subset inclination groups and/or the full azimuth (0° to 360°) will be divided into subset azimuth groups. It should be clear that more restricted version (e.g., inclination less than 90°, etc.) could be used instead.

Continuing with the example of FIG. 8, next the range restricted dip inclination/azimuth groups will be examined to determine which to use in performing DOPI migration (block 820). In an embodiment, the group that potentially best images a particular reflector of interest (e.g., one that is steeply dipping) will be identified. This is based on the assumption that the potentially imaged reflector dip orientation is orthogonal to the bisection direction of a source and receiver arriving ray pair at an image point. More particularly, the source/receiver propagation direction pairs that image each point in the output image (x,y,z) will be calculated. The bisection direction associated with each source/receiver pair will be determined. This, then, can be used to determine a dip azimuth (e.g., with respect to an arbitrary direction such as "north") and a dip inclination (e.g., with respect to a horizontal plane).

Using the SF principle in DOPI migration will tend to produce well-separated DOPI migration images (block 820). Multiple images of DOPI migration and a standard migrated image can be generated simultaneously in this block with one migration run. The multiple images (one per inclination/azimuth range) might be subsequently combined (e.g., stacked) or not depending on how they are intended to be used. In some embodiments, it might be desirable to view the uncombined images individually to see certain dipping events in greater detail. DOPI migration is implemented in some embodiments via beam migration. That being said, those of ordinary skill in the art will understand that DOPI migration could be adapted to use Kirchhoff migration, one-way wave equation migration, reverse time migration, etc.

Finally, in an embodiment the DOPI migration images can be used by seismic interpreters (possibly after additional post processing, bock 823) in exploration and other contexts (block 825) to provide additional views of the subsurface from specified illumination directions as compared with standard migration images which cannot offer this ability.

The self-fulfilling characteristic of SF migration should be understood to be a potential weakness of this approach: it heavily depends on the dip field provided. It is difficult to interpret all the horizons and faults in a 3D image, so typically computers are relied upon for the dip field estimation using, for example, semblance or plane-wave destruction. But at the places of complex or conflicting dips, computers can (and do) often get confused, yielding missed or misleading dips (e.g., dips measured from noise instead of signals). In FIG. 6C, a steep salt flank is missing (arrow) due to the wrong dip field captured from swing noise (arrow in FIG. 6B). In this situation, a manual correction could help. The computerized dip field also depends on the parameters chosen, such as the semblance window size, maximum dip allowed, and smoothing window length. It is important for interpreters to understand that the SF image could remove true primary events and filter out signals instead of noise in some areas if used improperly. But the S/N boost in most of a SF image can still be a very attractive tradeoff.

In addition to the two parameters mentioned above (the specular tolerance and the pre-specified dip field), a third parameter, beam width, influences the SF beam migration performance. The beam width, or vicinity index, defines how far away from the center ray path (from ray tracing) beam migration extrapolates the traveltime table to, using paraxial approximation in some embodiments. In SF beam migration, the ray directions may be extrapolated as well, for example, using a spherical wave front assumption. Narrow beam width improves the accuracy of traveltime and ray directions, and therefore is preferred. But it can create traveltime table holes. Nonetheless, those of ordinary skill in the art will recognize that the holes can be mitigated by finer surface bins and shooting denser rays.

Turning to another embodiment, DOPI beam migration, in essence, also relies on the subsurface ray directions. In this embodiment it decomposes the image by subsurface illumination directions (FIG. 3) at every image point, yielding rigorous separations among image subsets. Although sharing a decomposition concept, DOPI migration differs from the Vector Offset Output (VOO) which only splits the image subsets by simple vectors connecting shots to image points. Typically, DOPI migration decomposes the subsurface image according to subsurface dip inclinations or dip azimuths or their combinations. In some embodiments, each DOPI partial image provides a view of a single dip inclination/azimuth range at a time, preventing other dip interference. The summation of a complete set of decomposed DOPI partial images should amount at least approximately to the standard beam migration image.

FIGS. 9 and 10 contain examples of the application of DOPI migration to a synthetic dataset. FIGS. 9B, 9C and 9D are the decomposed image subsets according to dip angle ranges of [0° 20°], [20° 40°] and [40° 90°], respectively. These panels, when summed together, produce a result that is comparable to a standard beam migration. FIG. 9A provides an example of a standard beam migration for purposes of comparison. Each DOPI panel provides a view of a restricted dip angle range, which attenuates or eliminates interference from other dip angles. In these DOPI image examples, ray directions have not been extrapolated and thus may not be very accurate. As a consequence, there are some overlaps among different angles ranges. FIGS. 10A-10E contain an example of DOPI beam migration as applied to the same dataset that was used in FIG. 9. In this case, an embodiment is applied to different ranges of dip azimuths. FIGS. 10B, 10C, 10D and 10E are the decomposed image subsets according to dip azimuth ranges of [0° 90°], [90° 180°], [180° 270°] and [270° 360°] respectively. Their sum is comparable to a standard beam migration which is provided in FIG. 10A for purposes of comparison. Each DOPI image provides a view of a different dip azimuth range, which will tend to prevent interferences from dip azimuths outside of the permitted range.

According to still another embodiment, there is provided a method substantially as described herein but wherein an optical flow algorithm is used to calculate the wave propagation directions that can be used to extend the implementation of SF and DOPI to wavefield-based migrations, for example, reverse time migration. Optical flow algorithms are well known to those of ordinary skill in the art and, thus, will not be discussed in any detail here. That being said, one source of algorithms that would be suitable for use with an embodiment would be the Horn-Schunck method (K. P. Horn and B. G. Schunck, "Determining optical flow." Artificial Intelligence, vol. 17, pp. 185-203, 1981), the disclosure of which is incorporated herein by reference as if fully set out at this point.

By way of general background, in a video context the optical flow problem seeks to solve every pixel's apparent velocity between successive image frames, and numerous approaches have been suggested. Here the Horn-Schunck methodology referenced above will be utilized in this embodiment. However, since Horn-Schunck are focused on 2D, the discussion that follows will be modified to be more suitable for use with seismic data, i.e., a 3D variation will be taught below.

In reverse time migration (RTM), for example, if the 3D source (or receiver) wavefields $P_1(x,y,z)$ and $P_2(x,y,z)$ at two successive times $t_1$ and $t_2$, respectively are available, the task will be to find the motion vector $M(x,y,z)$ at each grid point from $P_1$ to $P_2$.

At each grid point, the motion vector $M(x,y,z)$ may be written as $(u,v,w)$, where u, v, and w are the x, y, and z components of the motion vector, respectively, and $$\sqrt{u^2+v^2+w^2}$$

is the magnitude of the motion, or speed.

Now, assume, for purposes of this example, that $$P(x,y,z,t)=P(x+\Delta x, y+\Delta y, z+\Delta z, t+\Delta t)$$

and by using the Taylor expansion, the optical flow equation can be written as follows:

$$P_x u + P_y v + P_z w + P_t = 0,$$

where $P_x$, $P_y$, and $P_z$ are the partial derivatives of the wavefield and $P_t$ is the temporal derivative of the wavefield. They are defined as follows and estimates of these quantities can readily be calculated using $P_1(x,y,z)$ and $P_2(x,y,z)$.

$$P_x = \frac{\partial P}{\partial x},$$

-continued $$P_y = \frac{\partial P}{\partial y},$$

$$P_z = \frac{\partial P}{\partial z},$$

and $$P_t = \frac{\partial P}{\partial t}.$$

Continuing with the present example, the 3D Horn-Schunck method steps can be described as follows when extended to 3D. The 3D version of this algorithm minimizes:

$$E = \iiint [(P_x u + P_y v + P_z w + P_1)^2 + \alpha^2(\|\nabla u\|^2 + \|\nabla v\|^2 + \|\nabla w\|^2)] dx dy dz,$$

where $\|\nabla\|^2$ is a spatial gradient operator defined as where $\|\nabla\|^2$ is a spatial gradient operator defined as $$\|\nabla\|^2 = \left(\frac{\partial}{\partial x}\right)^2 + \left(\frac{\partial}{\partial y}\right)^2 + \left(\frac{\partial}{\partial z}\right)^2,$$

and $\alpha$ is a weighting factor. Continuing with the present example, minimization E above can be approached via the following iterative scheme:

$$u^{n+1} = \overline{u}^n - \frac{P_x(P_x \overline{u}^n + P_y \overline{v}^n + P_z \overline{w}^n + P_t)}{\alpha^2 + (P_x)^2 + (P_y)^2 + (P_z)^2},$$

$$v^{n+1} = \overline{v}^n - \frac{P_y(P_x \overline{u}^n + P_y \overline{v}^n + P_z \overline{w}^n + P_t)}{\alpha^2 + (P_x)^2 + (P_y)^2 + (P_z)^2},$$

$$w^{n+1} = \overline{w}^n - \frac{P_x(P_x \overline{u}^n + P_y \overline{v}^n + P_z \overline{w}^n + P_t)}{\alpha^2 + (P_x)^2 + (P_y)^2 + (P_z)^2},$$

where $\overline{u}$, $\overline{v}$ and $\overline{w}$ are defined by:

$$\overline{u}_{i,j,k} = \frac{1}{32}\left(\sum_{ii=-1,0,1}\sum_{jj=-1,0,1}\sum_{kk=-1,0,1} u_{i+ii,j+jj,k+kk} + u_{i-1,j,k} + u_{i+1,j,k} + u_{i,j-1,k} + u_{i,j+1,k} + u_{i,j,k-1} + u_{i,j,k+1} - u_{i,j,k}\right),$$

$$\overline{v}_{i,j,k} = \frac{1}{32}\left(\sum_{ii=-1,0,1}\sum_{jj=-1,0,1}\sum_{kk=-1,0,1} v_{i+ii,j+jj,k+kk} + v_{i-1,j,k} + v_{i+1,j,k} + v_{i,j-1,k} + v_{i,j+1,k} + v_{i,j,k-1} + v_{i,j,k+1} - v_{i,j,k}\right),$$

$$\overline{w}_{i,j,k} = \frac{1}{32}\left(\sum_{ii=-1,0,1}\sum_{jj=-1,0,1}\sum_{kk=-1,0,1} w_{i+ii,j+jj,k+kk} + w_{i-1,j,k} + w_{i+1,j,k} + w_{i,j-1,k} + w_{i,j+1,k} + w_{i,j,k-1} + w_{i,j,k+1} - w_{i,j,k}\right),$$

where, j and k are the spatial indices of x, y and z axes, respectively.

So, by way of summary of this embodiment, the 3D Horn-Schunk method can be implemented as follows:
1. Obtain the input to the Horn-Schunck method: two successive wavefields $P_1(x,y,z)$ and $P_2(x,y,z)$.
2. Calculate the spatial and temporal derivatives from $P_1(x,y,z)$ and $P_2(x,y,z)$:

$$P_x = \frac{\partial P}{\partial x},$$

$$P_y = \frac{\partial P}{\partial y},$$

$$P_z = \frac{\partial P}{\partial z}$$

and $$P_t = \frac{\partial P}{\partial t}.$$

3. Choose a maximum number of iterations, N, and a weight $\alpha$. Generally speaking, N and $\alpha$ are data dependent, however, in the absence of the data we typically choose N=20 and $\alpha$=1).
4. Set initial values $u^0 = v^0 = w^0 = 0$.
5. Use $u^n$, $v^n$ and $w^n$ to calculate $\overline{u}^n$, $\overline{v}^n$ and $\overline{w}^n$.
6. Use $\overline{u}^n$, $\overline{v}^n$ and $\overline{w}^n$ to calculate $u^{n+1}$, $v^{n+1}$ and $w^{n+1}$.
7. Repeat steps (5) and (6) till the iteration counter reaches N (i.e., n=0, 1, . . . , N-1).
8. When the iteration count reaches N, ($u^{n+1}$, $v^{n+1}$, $w^{n+1}$) is the motion vector output between wavefields $P_1(x,y,z)$ and $P_2(x,y,z)$.

Returning now to the embodiment of FIG. 7, according to another variation of this embodiment, one block involves the use of the calculated dip field, specularity index and ray/wave propagation directions to perform a filtered SF migration (block 725). Pursuant to the present embodiment, the wave propagation directions will be calculated using an optical flow algorithm.

Similarly with respect to a variation of the embodiment of FIG. 8, one block involves the use of the dip inclination/azimuth ranges and the ray/wave propagation directions to perform a DOPI migration (block 820). Pursuant to the present embodiment, the wave propagation directions will be calculated using an optical flow algorithm as discussed above.

By way of explanation, SF/DOPI-beam and SF/DOPI-RTM migrations rely on the accurate calculation of the ray/wavefield propagation directions. Calculating ray propagation directions in SF-beam and DOPI-beam migration can be done through ray-tracing as discussed previously. However, the calculation of wavefield propagation directions within a "reasonable" cost and a "reasonable" accuracy in the case of SF-RTM and DOPI-RTM can be challenging. There are a few Poynting-vector based approaches for obtaining wave propagation directions, however, stability of the directions obtained is a concern. The SF-RTM and DOPI-RTM method borrows the optical flow concept from computer vision to produce stable and low-cost wave propagation directions. The Horn-Schunck method is used in one embodiment of the SF-RTM and DOPI-RTM code, and it runs much more efficiently compared to other (e.g., the Lucas-Kanade method) which has been used in other contexts to produce other products such as RTM angle gathers.

The SF image (e.g., SF beam migration image or SF RTM image) typically provides a cleaner image to work with, however, the non-specular filter (NSF) image can also be valuable. The NSF image can be produced by subtracting the SF image volume from the standard image volume. The NSF-beam or NSF-rtm image provides a unique view of the imaged scattering points and, potentially, even the internal texture of rocks. The NSF-beam or NSF-rtm may be used to help understand, for example, rock fractures, faults, drilling hazards, and etc.

Certain methods taught herein provide a new seismic imaging condition using ray propagation directions at every subsurface image point that has been implemented in beam migration to produce new image volumes. In an embodiment, with a-priori information of the dip field measured from an existing migration image or interpreted horizons, Specular Filter (SF) beam migration effectively suppresses migration noise and makes signals stand out. Dip Oriented Partial Imaging (DOPI) beam migration, however, does not rely on the specification of dip information. It decomposes the standard image by subsurface dip inclinations or/and azimuths to provide extra views from certain illumination directions. Generating extra SF and DOPI images in standard beam migration does not need much extra computation, but requires a fair amount of extra memory for ray direction storage. Besides beam migration, SF and DOPI concepts can be adapted to Kirchhoff migration, WEM and RTM. In addition, the SF concept may impact tomography and AVO work with by producing cleaner and higher-quality common image gathers.

By way of summary, in one embodiment Filtered Beam Migration (SF-beam) uses only specular rays (optionally with some specularity tolerance) to produce an image. If non-specular rays are removed from the imaging condition, this will tend to suppress migration swing noise (that often cuts across horizons), multiples, refraction waves, etc., produced by the non-specular rays, while simultaneously preserving primary signals contributed by the specular rays. This embodiment works well in both sediment and salt related environments and typically results in a much cleaner image.

One aspect of this embodiment is the specularity criterion that is evaluated for every image point and for every arriving ray pair. In one embodiment it is measured by the dot product of the reflector normal vector and the normalized bisection direction of the arriving source and receiver rays (in isotropic media) or corresponding slowness vectors (in anisotropic media). Although a dot product magnitude of 1.0 would mean perfectly specular, in practice, some tolerance will often be allowed, as an example, to take a dot product magnitude above 0.8 or 0.9 for imaging. Prior to migration, in some embodiments a subsurface dip field of the whole 3D image volume needs to be provided, which can be estimated from the previous migration stack.

This method could be compared with a local dip filtering algorithm by beam migration. One prior art algorithm sets one upper and one lower dip boundary for a target area (subvolume) for application of the dip filtering algorithm. The target area is migrated separately and later merged with a normally migrated volume. Instead of using two constant dip boundaries as has been done in the prior art, the instant SF-beam migration method takes a spatially variable dip field estimated in the whole volume (not a target area), which has different upper and lower dip boundaries at different imaging points. In addition, the SF-beam method applies to a whole image volume (i.e., not a target subvolume) without requiring a "cut off" and "paste back" of a target area.

Note that when the term "threshold" is used herein, that term should be broadly construed to include instances where there the associated values must satisfy a mathematical inequality (e.g., $|si|>0.9$) as well as instances where there is a transition from, say, unity to zero in an associated weight function which might be, by way of example, a Gaussian, cosine, triangle, etc., taper. In some instances, the absolute value of the threshold might be between zero and unity.

According to another aspect of the instant disclosure, there is Dip-Oriented Partial Imaging beam migration (DOPI beam) that decomposes the full image into a few subsets of partial images according to arriving ray directions (bisection of source and receiver sides) at subsurface image points. Decomposition criteria can be subsurface dip inclinations or dip azimuths or both. Such partial images provide different, complementary views of the subsurface by enhancing particular structural dip angles/azimuths, using well-separated subsurface illumination directions. DOPI-beam shares some similar concepts with Vector Offset Output (VOO), but major difference exists. An embodiment of the DOPI beam approach uses accurate subsurface ray directions to illuminate a particular subsurface dip inclination/azimuth range at each image point, while VOO uses simple directions connecting sources to image points. An estimated dip field based on a previous image is not required for DOPI beam migration.

For purposes of the claims that follow, the term "propagation direction" will generally be used to refer to a ray propagation direction (if ray tracing is employed) or a wave propagation direction (if wave equation migration is used) and should be interpreted accordingly depending on the context in which it is used.

Additionally, those of ordinary skill in the art will understand that seismic data can generally be accessed in terms of time, depth, or frequency and, as such, techniques that are implemented in one domain and usually be implemented in the other two, albeit possibly with greater (or lesser) computational complexity.

It should also be noted and remembered that the embodiments presented herein are only given as examples and the teachings should not be limited to these examples unless specifically so indicated.

Further, although the text might have described the seismic sources as "guns", "airguns", etc., that was done only for purpose of illustration and any marine source including, without limitation, air guns, water guns, sparkers, boomers, chirp systems, water sirens, marine vibrators, etc., might potentially be used. Additionally, as noted previously the instant disclosure could be applied on land as well. Further, instances where the term "shot" was used herein should not be construed to limit the instant disclosure to only operating with impulsive sources. Thus, when the term "seismic survey" is used herein that term should be understood to apply to a survey on water, land, or any combination of same.

Still further, where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, when in this document a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Additionally, while this disclosure is susceptible of embodiment in many different forms, there is shown in the drawings, and will herein be described hereinafter in detail, some specific embodiments. It should be understood, however, that the present disclosure is to be considered an exemplification of the principles of the system and method taught herein and is not intended to limit it to the specific embodiments or algorithms so described.

In the foregoing, much of the discussion has been discussed largely in terms of conventional seismic surveys, but that was done for purposes of illustration only and not out of an intent to limit the application or present embodiments to only those sorts of surveys. Those of ordinary skill in the art will understand how the embodiments presented supra could readily be applied, by way of example, to 2D, 3D, 4D, etc., surveys, down hole surveys, VSP surveys, cross hole surveys, or any combination of same.

While embodiments of a device has been described and illustrated herein by reference to certain embodiments in relation to the drawings attached hereto, various changes and further modifications, apart from those shown or suggested herein, may be made therein by those skilled in the art, without departing from the spirit of the concept, the scope of which is to be determined by the following claims.

What is claimed is:

1. A method of seismic exploration above a region of the subsurface of the earth containing structural or stratigraphic features conducive to the presence, migration, or accumulation of hydrocarbons, wherein is provided a seismic survey collected proximate to the region of the subsurface of the earth, said seismic survey comprising a plurality of seismic traces, comprising the steps of:
   (a) accessing at least a portion of said plurality of seismic traces;
   (b) obtaining a dip field associated with said accessed plurality of seismic traces, said dip field at least being defined at a plurality of (x,y,z) image points within said seismic survey;
   (c) specifying an upper specular index threshold and a lower specular index threshold different from said upper specular index threshold at each of said plurality of (x,y,z) image points;
   (d) for each of said plurality of (x,y,z) image points,
      (i) obtaining one or more source/receiver propagation direction pairs at said (x,y,z) image point,
      ii) for each of said obtained one or more source/receiver propagation direction pairs at said (x,y,z) image point, using said dip field to obtain an associated specular index value;
      (iii) determining an associated upper specular index threshold and an associated lower specular index threshold associated with said (x,y,z) image point,
      (iv) selecting any source/receiver propagation direction pairs associated with said (x,y,z) image point that have a specular index value greater than said associated upper specular index threshold or less than said associated lower specular index threshold, and,
      (v) using any of said selected source/receiver propagation direction pairs to form a migrated image at said (x,y,z) image point,
         wherein said migrated images at said plurality of (x,y,z) image points taken together form a migrated seismic dataset; and,
   (e) using at least a portion of said migrated seismic dataset in exploration for hydrocarbons within the region of the subsurface of the earth.

2. The method of seismic exploration according to claim 1,
   wherein said all of said upper specular index threshold specified at each of said (x,y,z) image points is a same value equal to 0.8, and,
   wherein all of said lower specular index threshold specified at each of said (x,y,z) image points is a same value equal to −0.8.

3. The method according to claim 1, wherein said source/receiver propagation direction pairs of step (i) are source/receiver ray propagation direction pairs that are either
   obtained via ray tracing during a Kirchhoff migration of said at least a portion of said plurality of seismic traces, or,
   obtained via ray tracing during a beam migration of said at least a portion of said plurality of seismic traces.

4. The method according to claim 1, wherein said source/receiver propagation direction pairs of step (i) are source/receiver wave propagation direction pairs that are either
   obtained via optical flow within a one-way wave equation migration of said at least a portion of said plurality of seismic traces, or,
   obtained via optical flow within a reverse time migration of said at least a portion of said plurality of seismic traces.

5. The method of seismic exploration according to claim 1, wherein each of said upper specular index threshold specified at each of said (x,y,z) image points is a positive value that is equal to an absolute value of said lower specular index threshold at a same (x,y,z) image point.

6. The method of seismic exploration according to claim 1, wherein all of said upper specular index threshold specified at each of said (x,y,z) image points is a same constant value and wherein all of said lower specular index threshold specified at each of said (x,y,z) image points is another constant value.

7. The method of seismic exploration according to claim 1, wherein said migrated image at each of said (x,y,z) image points is formed using a migration method that is selected from the group consisting of a beam migration, a Kirchhoff migration, a one-way wave equation migration, and a reverse time migration.

8. The method of seismic exploration according to claim 1, wherein said specular index threshold specified at each of said (x,y,z) image points is a taper selected from the group consisting of a Gaussian taper, a cosine taper, and a triangle taper.

9. A computer system containing a plurality of computer instructions adapted to perform a method comprising:
   (1) accessing a plurality of seismic traces collected proximate to a subsurface target;
   (2) performing a migration on said plurality of seismic traces;

(3) obtaining from said migration an estimate of a dip field, said dip field at least being defined at a plurality of (x,y,z) image points proximate to said subsurface target;

(4) specifying a specular index threshold greater than zero at each of said (x,y,z) image points;

(5) for each of said (x,y,z) image points,
  (i) obtaining one or more source/receiver propagation direction pairs at said (x,y,z) image point,
  (ii) using said dip field and any of said one or more source/receiver propagation direction pairs at said (x,y,z) image point to obtain a specular index value associated with said any of said one or more source/receiver direction pairs;
  (iii) determining a specular index threshold associated with said (x,y,z) image point,
  (iv) selecting any source/receiver propagation direction pairs associated with said (x,y,z) image point that have an absolute value of said obtained specular index value greater than said associated specular index threshold, and,
  (v) using any of said selected source/receiver propagation direction pairs to form a migrated image at said (x,y,z) image point,
  wherein said migrated images at each of said plurality of (x,y,z) image points taken together form an SF migrated seismic dataset; and, (6) using at least a portion of said SF migrated seismic dataset in exploration for hydrocarbons proximate to said subsurface target.

10. The method of seismic exploration according to claim 9, wherein all of said specular index threshold specified at each of said (x,y,z) image points are greater than 0.8.

11. The method of seismic exploration according to claim 9, wherein said specular index threshold greater than zero that is specified at each of said (x,y,z) image points is a taper, said taper being selected from the group consisting of a Gaussian taper, a cosine taper, and a triangle taper.

12. The method of seismic exploration according to claim 9, wherein said specular index threshold greater than zero that is specified at each of said (x,y,z) image points varies spatially.

13. The method of seismic exploration according to claim 9, wherein said migrated image at each of said (x,y,z) image points is obtained using a migration selected from the group consisting of a beam migration, a Kirchhoff migration, a one-way wave equation migration, and a reverse time migration.

14. A method of seismic exploration above a region of the subsurface of the earth containing structural or stratigraphic features conducive to the presence, migration, or accumulation of hydrocarbons, wherein is provided a seismic survey collected proximate to the region of the subsurface of the earth, said seismic survey comprising a plurality of seismic traces, comprising the steps of:
  (a) accessing at least a portion of said plurality of seismic traces;
  (b) obtaining a dip field associated with said accessed plurality of seismic traces;
  (c) specifying at least one specular index threshold less than 1.0;
  (d) using said dip field in conjunction with said at least one specular index threshold to guide a specular filter migration applied to said accessed plurality of seismic traces, thereby creating a migrated seismic dataset; and,
  (e) using at least a portion of said migrated seismic dataset in exploration for hydrocarbons within the region of the subsurface of the earth.

15. The method according to claim 14,
  wherein said dip field is defined at a plurality of (x,y,z) image points,
  wherein each of said (x,y,z) image points has at least one source/receiver propagation
  direction pair associated therewith, each of said at least one source/receiver propagation
  direction pairs being associated with a specular index value,
  wherein step (d) comprises the steps of:
    (d1) at each of said (x,y,z) image points, selecting any of said at least one pair of source/receiver propagation directions associated with said each (x,y,z) image point that has a specular index whose absolute value is greater than said particular specular index threshold associated with each said (x,y,z) image point,
    and,
    (d2) using any of said selected propagation direction pairs in a specular filter migration on said accessed portion of said plurality of seismic traces to create a migrated seismic dataset, thereby using said dip field to guide said specular filter migration.

* * * * *